(12) United States Patent
Carter et al.

(10) Patent No.: US 9,070,198 B2
(45) Date of Patent: Jun. 30, 2015

(54) METHODS AND SYSTEMS TO REDUCE DISPLAY ARTIFACTS WHEN CHANGING DISPLAY CLOCK RATE

(75) Inventors: Collis Quinn Carter, Richmond Hill (CA); Natan Shtutman, Maple (CA); Jonathan Wang, North York (CA); Stephen Ho, Markham (CA); Nicholas James Chorney, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 492 days.

(21) Appl. No.: 13/485,205

(22) Filed: May 31, 2012

(65) Prior Publication Data

US 2013/0083043 A1 Apr. 4, 2013

Related U.S. Application Data

(60) Provisional application No. 61/541,766, filed on Sep. 30, 2011.

(51) Int. Cl.
*G06T 1/20* (2006.01)

(52) U.S. Cl.
CPC ........................................ *G06T 1/20* (2013.01)

(58) Field of Classification Search
CPC ............ G06T 15/005; G06T 1/20; G06T 1/60
USPC .................................. 345/506, 531, 534, 686
See application file for complete search history.

(56) References Cited

U.S. PATENT DOCUMENTS

| 2007/0291038 | A1* | 12/2007 | Herz et al. | 345/501 |
| 2008/0143729 | A1* | 6/2008 | Wyatt et al. | 345/501 |
| 2008/0297654 | A1* | 12/2008 | Verberkt et al. | 348/500 |
| 2009/0295813 | A1* | 12/2009 | Nose et al. | 345/531 |

\* cited by examiner

*Primary Examiner* — Maurice L McDowell, Jr.
*Assistant Examiner* — Kyle Zhai
(74) *Attorney, Agent, or Firm* — Volpe and Koenig, P.C.

(57) ABSTRACT

Methods, systems, and computer readable media embodiments for reducing or eliminating display artifacts caused by on-the-fly changing of the display clock are disclosed. According to an embodiment of the present invention, a method includes, changing a rate of a display clock, and adapting a display data processing pipeline clocked by the display clock to prevent a substantial change in a pixel output rate from the display data processing pipeline based upon the changing.

21 Claims, 7 Drawing Sheets

METHODS AND SYSTEMS TO REDUCE DISPLAY ARTIFACTS WHEN CHANGING DISPLAY CLOCK RATE

CROSS REFERENCE TO RELATED APPLICATIONS

This application claims the benefit of U.S. provisional application No. 61/541,766, filed on Sep. 30, 2011, which is hereby incorporated by reference in its entirety.

BACKGROUND OF THE INVENTION

1. Field of the Invention

The present invention relates generally to the display of video, and more particularly to adapting a system to changes in a display clock rate.

2. Background Art

A variety of display devices, such as digital monitors, liquid crystal display (LCD) televisions, and the like, are increasingly available at different screen sizes, resolutions, and display frequencies. It is often the case that parameters such as screen resolution and display frequency are adjusted during display of a video stream. In some cases, the display screen can be switched from a first display to a second display during the rendering of a video stream. The switching of displays, or of display characteristics such as size, resolution and frequency, can result in a change in the pixel clock frequency. The pixel clock frequency or pixel rate, as used herein, is the rate at which the images and/or video are rendered on the display screen. The pixel clock frequency depends primarily on the display characteristics of the display screen.

The data processing pipeline that prepares the images and video for display on the display screen is typically driven based upon a display clock that is, in general, synchronized to the pixel clock. The display clock rate is generally set at a rate equal to or greater than the pixel clock rate.

In many conventional systems, the display clock is set based on the highest applicable pixel clock. However, this approach may consume more power than would be required because the pixel clock can be lower than the highest applicable rate in most cases.

It may be desired that the display clock can be changed on-the-fly (i.e., during the display of images and/or video). Changes to the display clock rate may be required to support aspects, such as, switching of display screens, changing of display characteristics, and efficient power consumption. Changing the display clock to the lowest rate that can support the required pixel clock rate of the display screen(s) when possible, for example, can result in substantial reductions in source power requirements and reductions in power consumption. Such a change in the display clock changes can be affected automatically for reasons such as power saving and/or can be user-initiated. A synchronization mismatch of the display clock and the pixel clock can result in display artifacts (e.g., video corruptions) being visible, thus deteriorating the quality of the visual experience presented to the user.

When changing the display clock rate during the display of images and/or video, there may be an interval during which the display clock rate at which the display data processing pipeline is clocked and the pixel clock rate at which the display screens are clocked, are not synchronized. Display artifacts may be visible during this time interval in which the display clock and the pixel clock are not fully synchronized. Display artifacts include video distortions caused by the lack of pixels to display during an interval or the discarding of pixels due to buffer overflow.

BRIEF SUMMARY OF EMBODIMENTS OF THE INVENTION

Therefore, methods and systems are needed for reducing or eliminating display artifacts caused by on-the-fly changing of the display clock. Such methods and systems for reducing or eliminating display artifacts are disclosed that are based upon adapting a display data processing pipeline in response to the change of the display clock. By dynamically adapting the data processing pipeline in response to display clock changes, embodiments of the present invention enable the display clock frequency to be reduced. Such reduction of the display clock frequency can result in substantial power savings.

According to an embodiment of the present invention, a method includes, changing a rate of a display clock, and adapting a display data processing pipeline clocked by the display clock to prevent a substantial change in a pixel output rate from the display data processing pipeline based upon the changing.

A system embodiment includes a clock source configured to change a rate of a display clock, a rate generating module configured to embed a signal corresponding to a pixel clock to a display data processing pipeline clocked by the display clock, and a display pipeline adjuster. The display pipeline adjuster is configured to adapt the display data processing pipeline to prevent a substantial change in a pixel output rate from the display data processing pipeline based upon said change of the rate of the display clock.

Yet another embodiment includes a computer readable medium storing instructions that, when executed, cause a method that includes changing a rate of a display clock, and adapting a display data processing pipeline clocked by the display clock to prevent a substantial change in a pixel output rate from the display data processing pipeline based upon the changing.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF EMBODIMENTS OF THE INVENTION

Embodiments of the present invention, compared to conventional systems, reduce or eliminate display artifacts (e.g., video corruptions) that result due to the changing of a display clock rate. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system or computing device and/or a graphics controller device that can interface to one or more display screens. For example and without limitation, embodiments may include computers, including laptop computers, personal computers, or any other computer with a display terminal, game platforms, entertainment platforms, personal digital assistants, and video platforms, such as, flat-panel television displays.

Embodiments of the present invention dynamically adapt a virtual pixel clock so that the display artifacts caused due to a change in the display clock rate are reduced or eliminated. As used herein, the virtual pixel clock is a signal based on the pixel clock but which is distributed in the display clock domain. Specifically, as used herein, the virtual pixel clock is formed by inserting pixel enable flags (referred to sometimes as pixel enable tokens) in a display data processing pipeline that is clocked by the display clock. The inserted pixel enable flags represent the pixel clock in the display clock domain. The display data processing pipeline outputs its data to an asynchronous first-in-first-out (FIFO) buffer from which the data is read at the pixel clock rate to be displayed. The display clock timing information is communicated by the embedded pixel enable flags. When the asynchronous FIFO underflows or overflows due to any reason, including lack of synchronization between the pixel clock and the display clock, display artifacts can occur due to, respectively, momentarily running out of pixels to be displayed or dropping of one or more pixels due to lack of capacity in the asynchronous FIFO. Embodiments of the present invention are directed to reducing or eliminating the overflows or underflows of the asynchronous FIFO buffer when the display clock is changed, thereby reducing or eliminating display artifacts that occur due to changes in the display clock rate.

Figure 1:
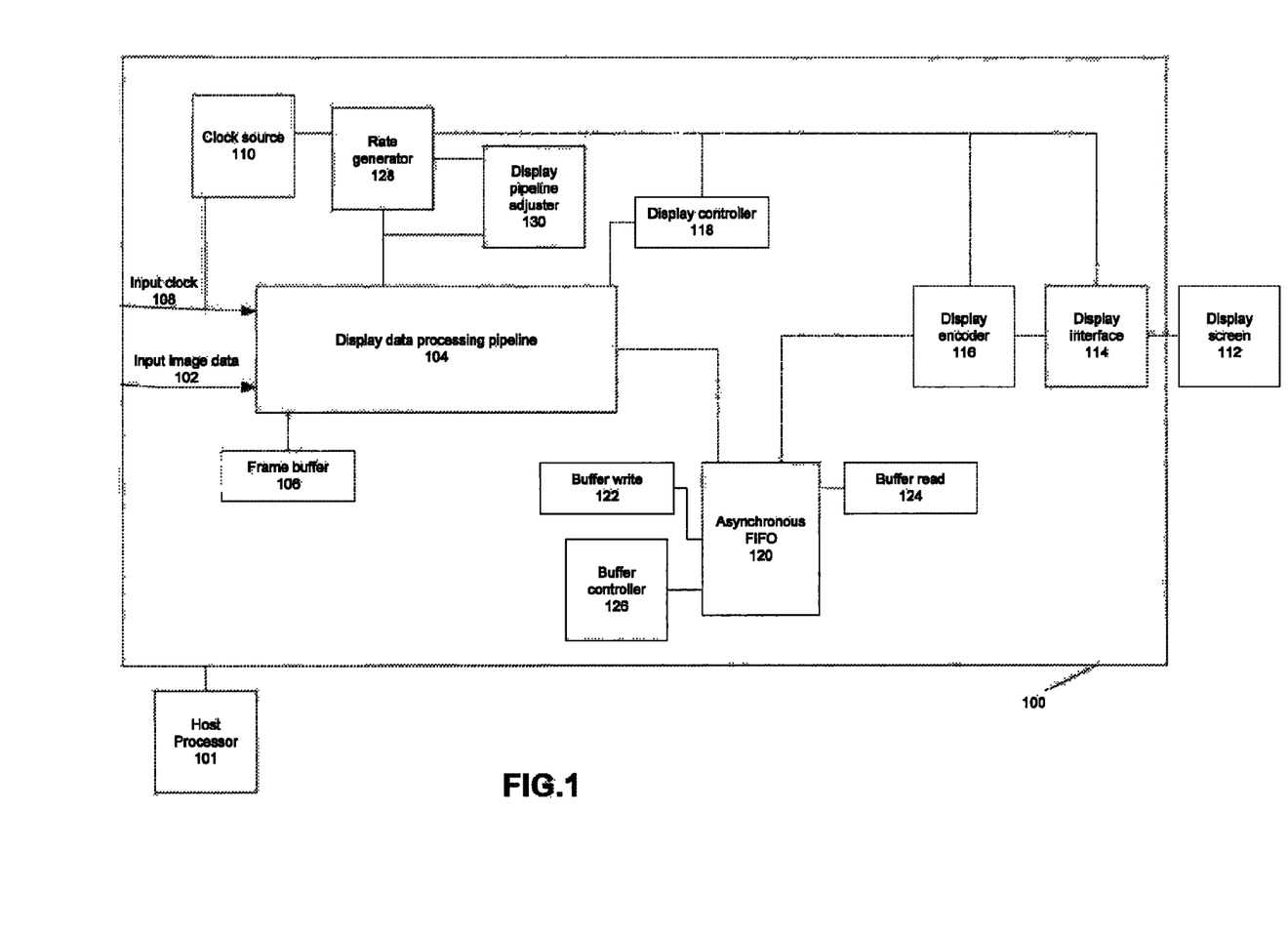
FIG. 1 illustrates a block diagram of system, according to an embodiment of the present invention.

FIG. 1 illustrates a system 100 for adapting to a change in display clock rate, according to an embodiment of the present invention. System 100 can be a system for displaying video content to one or more multiple display devices. System 100 can be a system for displaying video to a display screen for which the various display properties such as resolution and the like can be changed on-the-fly. System 100 includes a display data processing pipeline 104 that takes as input image data 102. The input image or video data 102 is clocked into the display pipeline 104 at an input clock rate 108. The input clock rate 108 can, for example, be the pixel clock rate. The display data processing pipeline 104 can have access to a frame buffer memory 106 for obtaining the input from and/or for storing intermediate and final processing results.

Display data processing pipeline 104 can include one or more processing modules that process data for display. For example, display data processing pipeline 104 can include a scaler (not shown) that scales the image according to characteristics of a particular display screen. According to some embodiments, display data processing pipeline 104 can also include one or more other processing stages (not shown) such as vertex processing, geometry processing, pixel processing, rasterizing, and the like. Display data processing pipeline can also include logic to include a predetermined delay to the processing by, for example, adding or deleting pipeline stages. Such added or deleted pipeline stages may comprise, for example, delay loops or other processing that may or may not change the content of the data stream.

Data from the display data processing pipeline 104 is input to the asynchronous FIFO buffer 120, for example, by writing using FIFO writing module 122. Writing module 122 can include functionality to, for example, write incoming data to the next available buffer slot to implement FIFO discipline. The writing into the FIFO 120 can be considered to be at the rate of the virtual pixel clock which is determined by the number of pixel valid flags that are output in a time interval. Data from the FIFO 120 can be read by FIFO read module 124 at a rate corresponding to the pixel clock rate. Read module 124 can include functionality to, for example, read data from buffer 120 according to the FIFO discipline. The data read from the FIFO 120 can then be encoded in display encoder 116 and displayed on display screen 112 by transmitting the data through display interface 114. A buffer controller 126 can include functionality to monitor the buffer occupancy or level of buffer occupancy. Buffer controller 126 can also include the functionality to signal a preconfigured entity when a buffer underflow or overflow occurs, or when a buffer occupancy threshold is met.

The display of the display data on display screen 112 is based upon a pixel clock rate corresponding to the display characteristics of display screen 112. Particularly, based upon the pixel clock rate corresponding to display screen 112, a module, such as display controller 118 generates horizontal and vertical synchronization signals upon which data is transmitted to the display screen to be displayed. Display controller 118 may, for example, include functionality to display each frame or each component thereof on display 112. For example, display controller 118 may generate the data signals and the gate control signals required to display each of the video frames on an LCD of display 112. Display encoder 116 performs encoding necessary, for example, transmission of the display data over interface 114 to display screen 112.

Display interface 114 can be any interface configured to transmit display data to a display screen. Display interface 114 may support one or more of interface standards, such as, but not limited to, DisplayPort interface standard, High Definition Multimedia Interface (HDMI) standard, Digital Visual Interface (DVI), Video Graphics Array (VGA) or its variants, and Low Voltage Differential Signaling (LVDS). Data and control information is transferred over interfaces 114 to respective display screens 112. The data transmitted over interface 114 can include pixel data, such as, red green blue (RGB) color sample data for each pixel. Control information transmitted over interface 114 can include timing synchronization signals such as, for example, horizontal sync signals, vertical sync signals, and data enable signals to synchronize the respective display device with system 100.

Display screen 112 can include any kind of display device capable of displaying content received from system 100. Display screen 112 can be any display device or screen such as a cathode ray tube (CRT) or a flat panel display. Flat panel displays come in many forms, liquid crystal displays (LCD), electroluminescent displays (ELD) and active-matrix thin-film transistor displays (TFT) being examples. Display screen 112 may receive data to be displayed, locations on the display device to be updated, as well as any timing information, over interfaces 114.

The image source (not shown) that provides input image data 102 may include one or more image sources that generate content for display in the display devices. According to an embodiment, image source can include a DVD player, a set top box, or other video content generator. According to another embodiment, image source can include one or more interfaces communicatively coupling system 100 to remote video content generators or image sources. For example, the image source can include a network interface over which streaming video content is received from a network such as a local area network or the Internet, which is then input to data processing pipeline 104 as input data 102.

Frame buffer 106 includes one or more memory devices, for example, dynamic random access memory (DRAM) devices. Frame buffer 106 is used to hold video data in memory while processing including the processing in display pipeline 104 is in progress. Frame buffer 106 or other memory devices (not shown) are used for holding the video data, before and after the encoding of the video data into video frames, until the respective frames are transmitted to a line buffer (not shown) and/or out of display interface 114. Frame buffer 106 may hold any data that is output to display devices 112. According to an embodiment, frame buffer 106 can include a plurality of physically or logically partitioned memories, where each display interface is associated with a respective or .e of the partitioned frame buffers.

Display data processing pipeline 104 includes the functionality to process image and/or video data content. For example, incoming video in MPEG2 format may be decoded, reformatted, and reframed as appropriate for local raster scan display in display data processing pipeline 104. Display data processing pipeline 104 may generate a stream of video frames as output. For example, the pixel data to be displayed can be output from display data processing pipeline 104 in the form of a raster scan, i.e., output line-by-line, left-to-right and top-to-bottom of the display. The stream of video frames may then run through an encoder 116. The encoder may encode the stream of video frames according to a predetermined encoding and/or compression standard. For example, encoder 116 may encode the stream of data output from pipeline 104 in a transport and display format required by the interface 114 and/or display 112. The encoder may encode the data according to a customized format or according to a standard such as DisplayPort, embedded DisplayPort, DVI, LVDS, or HDMI. Display data processing pipeline 104 may be communicatively coupled to a host processor 101 that may command one or more modules of display data processing pipeline 104 to change the rate of the display clock. Host processor 101 may receive instructions from a user or application to initiate the change in the display clock rate.

Rate generator 128 includes functionality to synchronize the virtual pixel clock (VPCLK) based on the display clock (DCLK) and the pixel clock (PCLK). Rate generator 128 can take as input the current PCLK rate from display interface 114 or other device, and the current DCLK rate from the source clock 110. Rate generator 128 can also be coupled to the display pipeline adjuster 130, and to display data processing pipeline 104. Rate generator 128 includes the functionality to sample the PCLK in the display clock domain, and to insert corresponding pixel enable flags in the display data processing pipeline. As described above, the VPCLK is represented by the pixel enable flags embedded in the data stream which is clocked by DCLK.

Display pipeline adjuster 130 includes logic to make adjustments to display processing pipeline 104. For example, the adjustments to the display data processing pipeline 104 are performed in order to achieve synchronization between the VPCLK and the PCLK, when the DCLK is changed. As described below, the adjustments to the display data processing pipeline can include adjusting the pipeline 104 so as to prevent any underflow and/or overflow occurring in the asynchronous FIFO 120.

Figure 2A:
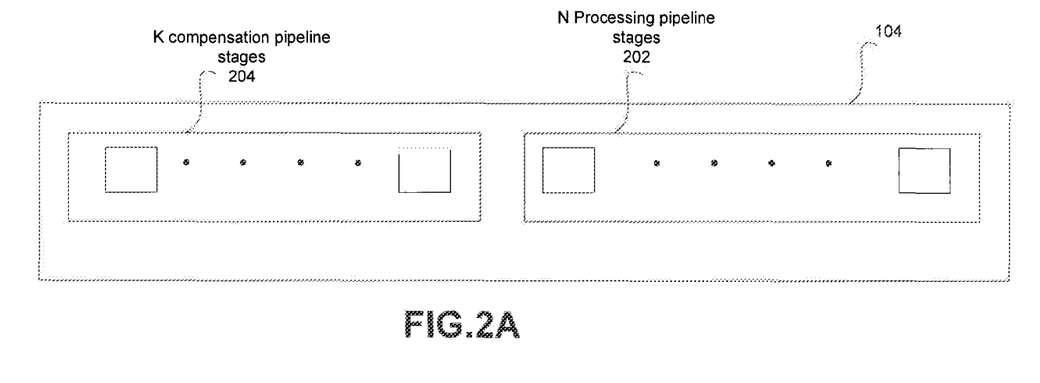
FIG. 2A illustrates a block diagram of a display data processing pipeline, according to an embodiment of the present invention.

FIG. 2 is a block diagram illustrating aspects of the display data processing pipeline 104 in more detail, according to an embodiment of the present invention. The rate generator 128 resynchronizes the PCLK to the DCLK and distributes the synchronized rate in the form of an enable (i.e., pixel valid flag) in the DCLK domain. The enable is treated as data and therefore is pipelined, through display data processing pipeline 104, on the way to the FIFO 120 that is used to transfer the data to the output encoder 116. The display data processing pipeline 104 can be considered as comprising a number, N, of pipeline stages 202 due to processing functions, and another number, K, of compensation pipeline stages 204. The delay through the pipeline 104, which can be expressed in pixel clocks, is a function of the depth of the pipeline 104 and the ratio between PCLK and DCLK. This can be expressed as in (1):

$$\text{PIPE\_DELAY} = \text{PIPE\_DEPTH} * \text{ROUND (FPCLK/FDCLK)} \tag{1}$$

Where FPCLK and FDCLK are the frequencies of pixel clock and display clock, respectively. The above relationship between PIPE_DELAY and PIPE_DEPTH may have a predetermined uncertainty, such as, of 1 PCLK.

If PIPE_DELAY changes, then this will show up as a temporary drop or increase in the write rate into asynchronous FIFO 120 causing the FIFO level (i.e., number of data items in the FIFO) to vary. Because the read rate from the FIFO is likely to remain constant, a speed-up of the write rate would lead to an increase in the level, and a slow-down of the write rate may lead to the lowering of the level. A decrease of the level can subsequently lead to lack of pixels to be read from the FIFO. An increase of the level can go beyond the depth configurations of the FIFO, thereby losing pixels due to overflow. Therefore the required depth for FIFO 120 is a function of the possible range of variation in PIPE_DELAY.

Even when rate generator 128 resynchronizes the VPCLK based upon the changed DCLK, there may be an interval during which the FIFO 120 is being read at the PCLK but is being written to at the previous (i.e. prior to resynchronization according to the latest change in PCLK) VPCLK. As described above, the VPCLK distributes a signal corresponding to PCLK in the DCLK domain. Also, as noted above, each pixel valid token can be considered as corresponding to the occurrence of a PCLK edge when sampled in DCLK domain. The gap, or interval, between two pixel valid tokens can be considered as in (2):

$$\text{ENABLE\_GAP} = \text{FDCLK/FPCLK} \tag{2}$$

As noted above, if an underflow or overflow of FIFO 120 occurs due to the difference in the write rate and the read rate of FIFO 120, then display artifacts can be visible in the image display on display screen 112. Thus, embodiments of the present invention reduce or eliminate display artifacts caused by changes to DCLK by adjusting the pipeline 104 and/or FIFO 120 so as to prevent or reduce the occurrence of underflow and overflow of FIFO 120.

According to an embodiment, the FIFO 120 can be configured to be large enough to accommodate the maximum level due to the difference between PCLK and DCLK. However, underflow cannot be prevented by changing the size of the FIFO 120 alone. Furthermore, having a large FIFO 120 may be cost inefficient. For example, if pipeline depth and FPCLK are considered fixed for a particular display configuration, then the difference in PIPE_DELAY is dependent on the range of FDCLK. Assuming, for illustrative purposes, that PIPE_DEPTH=16, FDCLK(MIN)=FPCLK, FDCLK(MAX)=FPCLK*24 (based on FPCLK(MIN)=25 MHz, FDCLK(MAX)=600 MHz), the PIPE_DELAY can range from 0 to +/−17, which requires that FIFO 120 has at least 34 entries.

According to selected embodiments of the present invention, in order to reduce or eliminate display artifacts caused by changes to DCLK, the pipeline 104 is adjusted so that, that the total delay through the pipeline 104, measured in time, remains constant, and so that when the resynchronization of VPCLK to the changed DCLK occurs there is no short-term change in ENABLE_GAP.

The delay (e.g., PIPE_DELAY) can also be expressed as:

$$D=(K+N)/FDCLK \qquad (3)$$

where D is the total delay in time through display data processing pipeline 104, K is the number of compensation pipeline stages, and N is the number of pipeline processing stages. N is a constant and FDCLK can be set by the programming of the DCLK source, such as clock source 110. K can be adjusted as needed to keep D substantially constant. K is adjusted, for example, by adding or removing pixel valid flags into or from the pipelined data stream. The adjustment of the pipeline delay, or more specifically, the adjustment of the pixel valid flags in pipeline 104 is described in greater detail in relation to FIGS. 3-7 below.

Figure 2B:
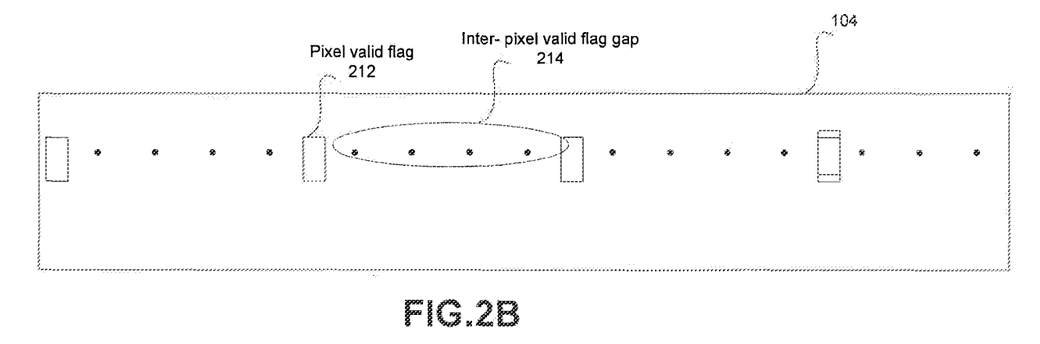
FIG. 2B illustrates pixel valid flags of a virtual pixel clock, according to an embodiment of the present invention.

FIG. 2B illustrates pixel valid flags 212 in the display data processing pipeline 104, according to an embodiment of the present invention. As noted above, the pixel valid flags in the stream of data communicate timing information from the display data processing pipeline 104 to the rest of the system. For example, the pixel valid flags embedded in the display data stream communicate the pixel clock information to display encoder 116 and/or display controller 118 which can, in turn, use the communicated timing information for generating display information and display control signals that are sent to display screen 112. Stated in another way, each embedded pixel valid flag corresponds to a rising edge of the pixel clock. Thus, the interval 214 between two successive pixel enable flags is referred to as a virtual pixel clock interval, and the clocking signal facilitated by the embedded pixel valid flags is referred to herein as the VPCLK.

The logic instructions for display data processing pipeline 104, clock source 110, rate generator 128, display pipeline adjuster 130, display controller 118, buffer control late 126, buffer write module 122, buffer read module 124, buffer 120, and other modules, can be implemented in software, hardware, or a combination thereof. For example, in one embodiment, logic instructions of one or more of the modules noted above can be specified in a programming language such as C, C++, or Assembly. In another embodiment, logic instructions of one or more of those modules can be specified in a hardware description language such as Verilog, RTL, and netlists, to enable ultimately configuring a manufacturing process through the generation of maskworks/photomasks to generate a hardware device embodying aspects of the invention described herein.

Figure 3:
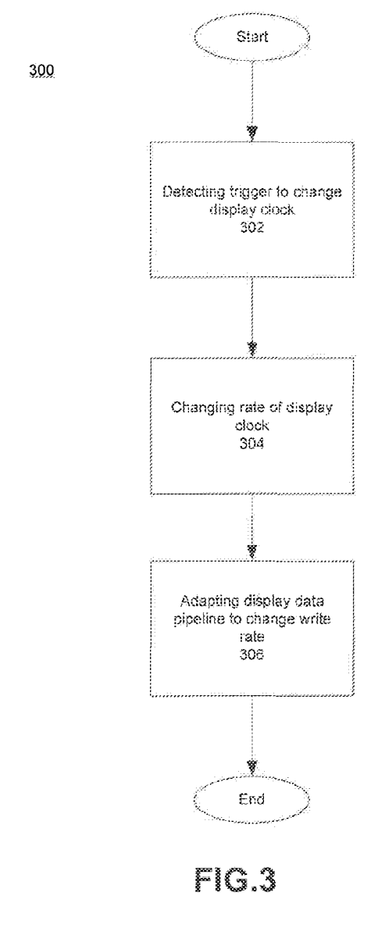
FIG. 3 is a flowchart illustrating a method of reducing or eliminating display artifacts, according to an embodiment of the present invention.

FIG. 3 is a flowchart illustrating a method 300 of reducing or eliminating display artifacts, according to an embodiment of the present invention. Method 300 can be used, for example, upon changing a DCLK rate during the display of images or video to a display 112, in order to adapt system 100 for the changed DCLK.

In step 302, a request or signal for changing the DCLK is detected. According to an embodiment, a clock source 110 can detect a request to increase or decrease the rate of the DCLK. The change in DCLK can be triggered automatically or by user action. Automatic triggering of the DCLK change may occur due to the system determining, for example, to reduce power consumption by slowing down the DCLK. User-initiated triggering of a DCLK change may occur, for example, when the user manually selects a display resolution. According to one embodiment, clock source 110 can synchronize DCLK, for example, based upon a newly changed PCLK. The description below addresses aspects of how the DCLK change, regardless of how it is triggered, is handled in the system in order to reduce or eliminate display artifacts.

In step 304, the DCLK is changed. For example, a clock source, such as clock source 110, can be programmed to adjust the DCLK based on requirements. For example, the DCLK may be changed to have a rate corresponding to a predetermined multiple of a newly changed PCLK rate. In another instance, it may be desired that the DCLK rate is reduced to a minimum rate based upon the current PCLK rate. According to an embodiment, the desired change in the DCLK can be changed by directly changing the clock source rate from the current rate to the desired rate. According to another embodiment, the desired change in the DCLK can be iteratively implemented by increasing or decreasing the DCLK rate in small steps up to the desired rate.

In step 306, the display data processing pipeline, such as pipeline 104, is adapted so that the write and read rates of FIFO 120 are matched to avoid overflow or underflow of the FIFO 120. According to an embodiment, the adapting of pipeline 104 includes adding or removing pixel valid tokens in the data stream in pipeline 104 so that the ENABLE_GAP remains substantially the same through the change of the DCLK rate change. According to another embodiment, the adding or removing pixel valid flags in the data stream in pipeline 104 is performed in small increments corresponding to small increments of change in DCLK, such that the disturbance (e.g., change in the level of FIFO 120) occurring from one change to another is minimized. In other words, adapting the display data processing pipeline includes ensuring that the VPCLK that determines that rate at which pixels are written into FIFO 120 is kept substantially the same throughout the change of the DCLK rate.

Figure 4:
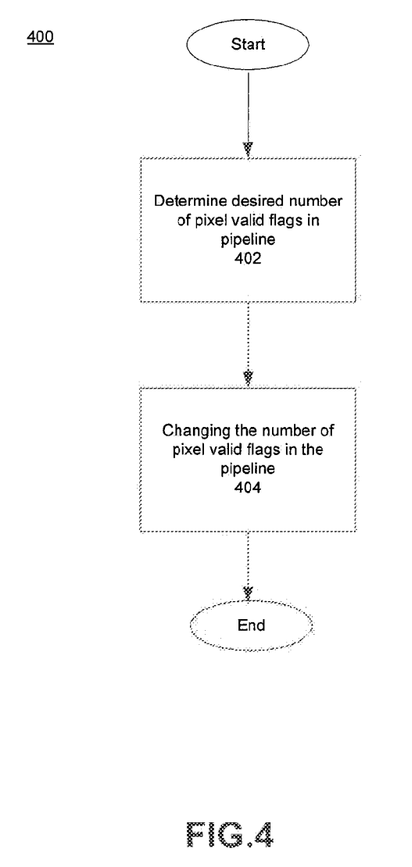
FIG. 4 is a flowchart illustrating a method for adapting a display data pipeline, according to an embodiment of the present invention.

FIG. 4 illustrates a method 400 for adapting the display data processing pipeline to a changed DCLK, according to an embodiment of the present invention. Method 400, for example, can be implemented in performing step 306 discussed above.

In step 402, a desired number of pixel valid flags are determined for the display data processing pipeline 104. According to an embodiment, the desired number of pixel valid tokens in the display data processing pipeline can be determined based upon the pipeline depth, PCLK and DCLK. As described above, the number of pixel valid flags embedded in the data stream and the depth of the pipeline determines the pipeline delay which is desired to be kept substantially the same.

In step 404, the display data processing pipeline 104 is changed in accordance with the desired number of pixel valid tokens to be embedded in the data stream in the pipeline 104. The changing of the pipeline 104 can for example, include adding or removing pixel valid tokens from the data stream.

Figure 5:
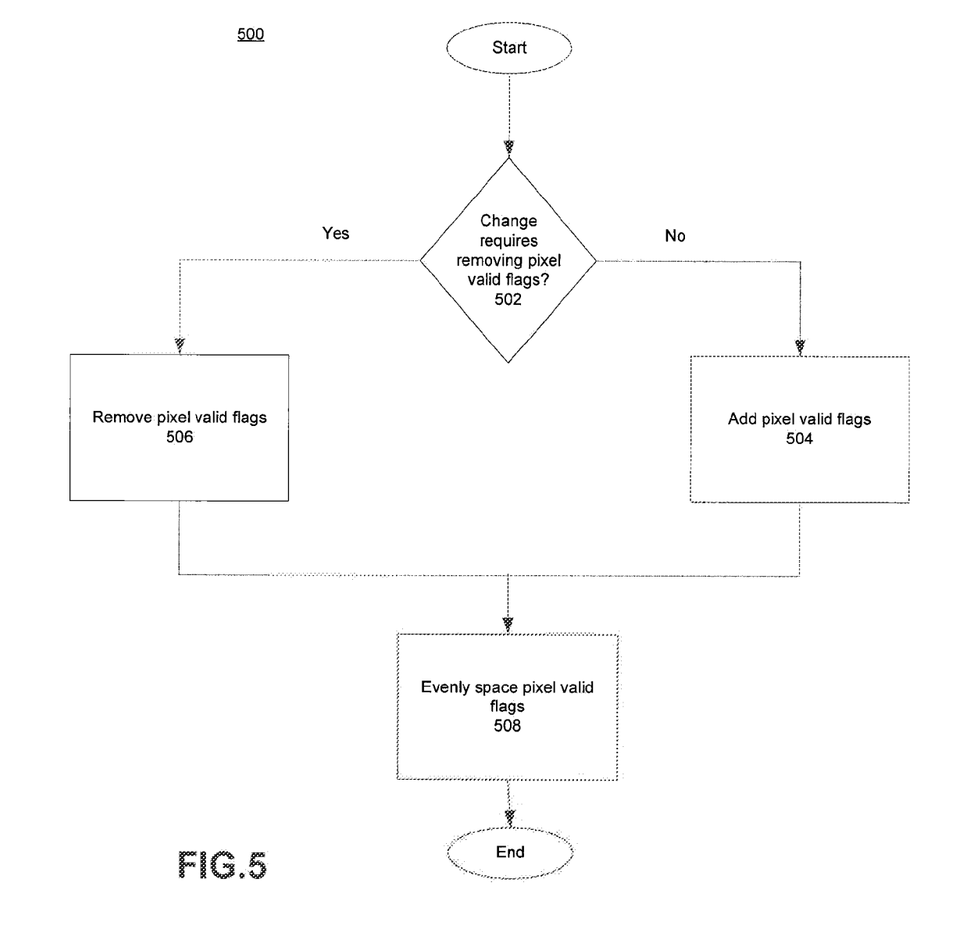
FIG. 5 is a flowchart illustrating a method for adjusting pixel valid tokens in a display data pipeline, according to an embodiment of the present invention.

FIG. 5 illustrates a method 500 of changing pipeline 104 based on the desired number of pixel valid tokens embedded in the data stream, according to an embodiment of the present invention. Method 500, for example, can be implemented to perform step 404 described above.

In step 502, it is determined whether the desired change requires an addition or removal of pixel valid tokens from the data stream. This determination can be made by comparing the desired number of pixel valid tokens determined in step 402 with the number of currently existing pixel valid tokens in pipeline 104. The number of currently existing pixel valid tokens in pipeline 104 can be determined based upon the previous values of DCLK and PCLK and the depth of the pipeline.

In step 504, the number of pixel valid tokens to be added is determined.

Alternatively, in step 506, the number of pixel valid tokens to be removed from the data stream is determined. Having determined the number of pixel valid tokens to be added or removed, in step 508 the display data processing pipeline 104 is arranged to have the desired number of embedded pixel valid tokens. According to an embodiment, the desired number of pixel valid tokens is arranged evenly-spaced in the data stream of the pipeline 104.

Figure 6:
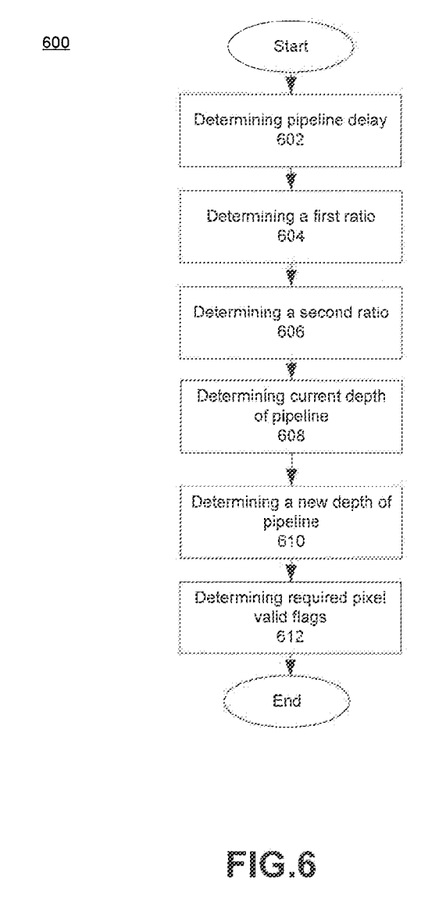
FIG. 6 is a flowchart illustrating a method for determining a number of pixel valid tokens that should be in a display data pipeline, according to an embodiment of the present invention.

FIG. 6 illustrates a method 600 for determining the desired number of pixel valid tokens to be embedded in the display data processing pipeline 104, according to an embodiment. For example, method 600 can be implemented in performing step 402 described above.

In step 602, the pipeline delay is determined. The pipeline delay can, for example, be determined according to (1) or (3) above. The pipeline delay, as described above in relation to (1) and (3), comprises the time included in a fixed number of pipeline processing stages and a variable number of compensation pipeline stages based upon FDCLK. The FDCLK used in this step is the pre-adjustment value.

In step 604, a first ratio based upon FDCLK/FPCLK, where both FDCLK and FPCLK are based upon pre-adjustment values, is determined.

In step 606, a second ratio based upon FDCLK/FPCLK, where both FDCLK and FPCLK are based upon post-adjustment values, is determined.

In step 608, a current depth of the pipeline is determined. The current depth of the pipeline can, for example, be determined based upon the delay and the first ratio.

In step 610, a desired depth of the pipeline is determined. The desired depth of the pipeline can, for example, be determined based upon the delay and the second ratio.

In step 612, the number of pixel valid tokens to be embedded in the display data processing pipeline is determined.

Having determined the desired number of pixel valid flags to be embedded in the display data processing pipeline when the DCLK rate is changed, as described in relation to method 500 above, the display data processing pipeline is changed.

Figure 7:
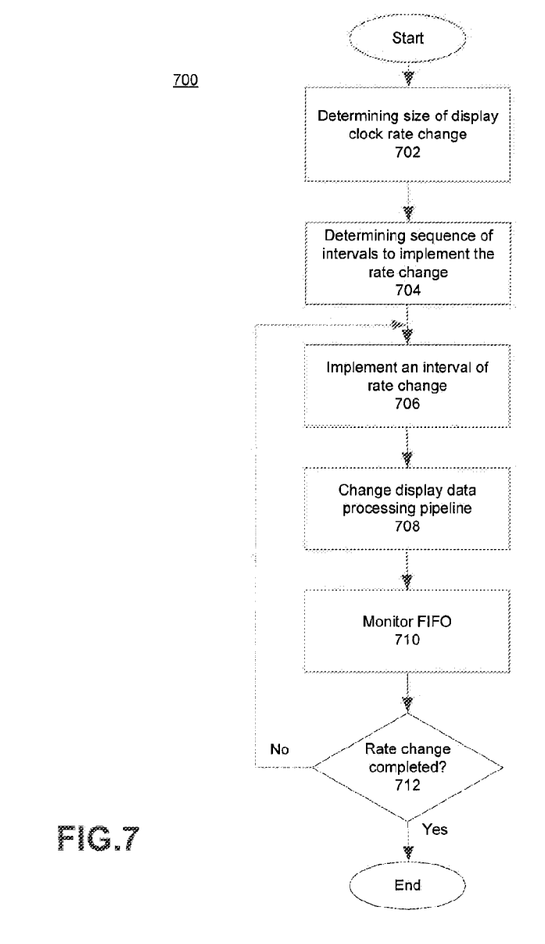
FIG. 7 is a flowchart illustrating a method for adjusting a display data pipeline in steps, according to an embodiment of the present invention.

FIG. 7 illustrates a method 700 by which a desired DCLK rate change is incrementally implemented. According to an embodiment, method 700 can be performed to implement the change in the DCLK rate and the adapting of the display data processing pipeline, described in relation to method 300 above, in increments of small steps.

In step 702, the size of the desired DCLK rate change is determined This size can be determined based upon various factors. For example, if the user-initiated the change, the desired rate may be determined based on user configuration, such as, the user configured display resolution. If the change in DCLK is to correspond with a change in the PCLK, then the new value of the PCLK and a preconfigured parameter indicating the frequency of the DCLK relative to the PCLK can be used.

In step 704, a step size or stride with which to implement the desired DCLK rate change is determined. This can be determined by, for example, using (3) above to determine the difference in the depth of the compensation pipeline K between the current DCLK rate and the desired DCLK rate while keeping the pipeline delay D substantially constant. The difference in the depth, $\Delta K$, of the compensation pipeline can then be divided into steps or strides of a determined size to increase or decrease. According to an embodiment, the stride of $1+\Delta K/N$, where N (as described above) is the number of processing stages of the pipeline. According to another embodiment, the stride can be $1+\Delta F/F_{min}$, where $F_{min}$ is the minimum possible DCLK rate for the current PCLK rate, and $\Delta F$ is the magnitude of the change in DCLK.

Steps 706-712 can be iteratively performed until the desired DCLK rate is reached, as determined in step 712.

In step 706, a stride of the rate change in the DCLK is implemented. As described above, the DCLK rate change may be implemented by changing the rate of a clock source 110.

In step 708, the corresponding required number of pixel valid flags are added or removed from the display data processing pipeline. The determination of the number of pixel valid flags to be added or removed for a particular change size is described above in relation to FIGS. 4 and 5.

As each stride is implemented, in step 710, the level of the FIFO 120 may be monitored by, for example, buffer controller 126. Based on the monitoring, further changes to the DCLK rate and/or compensation pipeline stages can be modified.

In step 712, it is determined whether the desired clock rate has been reached. If the desired clock rate has been reached, method 700 has completed. Otherwise, processing proceeds to step 706 to implement the next stride of change in the display clock rate.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
changing a rate of a display clock;
adapting a display data processing pipeline clocked by the display clock to prevent a substantial change in a pixel output rate from the display data processing pipeline based upon the changing, wherein a delay in the display data processing pipeline remains constant by adjusting a number of compensation pipeline stages; and,
writing an output data from the display data processing pipeline into a buffer at the pixel output rate.

2. The method of claim 1, wherein the number of compensation pipeline stages is adjusted by embedding a signal in the data stream of the display data processing pipeline, wherein the embedded signal corresponds to a pixel clock signal.

3. The method of claim 2, wherein the embedded signal is generated by sampling the pixel clock signal based upon the display clock.

4. The method of claim 2, wherein the embedded signal comprises data.

5. The method of claim 2, wherein the embedding the signal comprises inserting pixel valid flags in the display data processing pipeline, each of said pixel valid flags corresponding to a rising edge of the pixel clock signal.

6. The method of claim 5, wherein the adapting the display data processing pipeline comprises altering a depth of the display data processing pipeline.

7. The method of claim 5, wherein the altering the depth of the display data processing pipeline comprises adjusting a number of pixel valid flags simultaneously present in the display data processing pipeline.

8. The method of claim 7, wherein the adapting the display data processing pipeline further comprises:
determining a desired number of the pixel valid flags simultaneously present in the display data processing pipeline; and
evenly spacing the desired number of the pixel valid flags in the display data pipeline.

9. The method of claim 8, wherein the determining the desired number of the pixel valid flags comprises:
determining a delay of the display data processing pipeline;
determining a first ratio comprising a display clock rate prior to the synchronizing and a pixel clock rate;
determining a second ratio comprising a changed display clock rate and the pixel clock rate;
determining a current depth for the display data processing pipeline based upon the delay and the first ratio;
determining a new depth for the display data processing pipeline based upon the delay and the second ratio; and
determining a number of pixel valid tokens to be removed from or added to the display data pipeline based upon the current depth and the new depth of the display data processing pipeline.

10. The method of claim 5, wherein the changing the rate of the display clock comprises:
changing the display clock from a first rate to a second rate in a plurality of change steps; and
adapting the display data processing pipeline comprising, for a display clock rate corresponding to respective ones of said plurality of change steps, altering a depth of the display data processing pipeline based upon the display clock rate.

11. The method of claim 10, wherein the adapting the display data processing pipeline further comprises, for the display clock rate corresponding to respective ones of said plurality of change steps monitoring a level of a buffer receiving output of the display data processing pipeline.

12. The method of claim 10, wherein the altering the depth of the display data processing pipeline comprises adjusting a number of pixel valid flags simultaneously present in the display data processing pipeline.

13. The method of claim 12, further comprising controlling a write rate of pixels into the buffer to prevent overflow of the buffer.

14. The method of claim 12, further comprising controlling a write rate of pixels into the buffer to prevent underflow of the buffer.

15. The method of claim 2, wherein the buffer is read at a pixel rate.

16. A system comprising:
a host processor;
a clock source configured to change a rate of a display clock;
a rate generating module configured to embed a signal corresponding to a pixel clock in a display data processing pipeline clocked by the display clock; and
a display pipeline adjuster configured to adapt the display data processing pipeline to prevent a substantial change in a pixel output rate from the display data processing pipeline based upon said change of the rate of the display clock, wherein the embedded signal changes a number of compensation pipeline stages in the display data processing pipeline to maintain a constant delay in the display data processing pipeline.

17. The system of claim 16, wherein the rate generating module is further configured to embed the signal by inserting pixel valid flags in the data stream of the display data processing pipeline, each of said pixel valid flags corresponding to a rising edge of the pixel clock signal.

18. The system of claim 16, wherein the display data pipeline adjuster is farther configured to adapt the display data processing pipeline by altering a depth of the display data processing pipeline.

19. The system of claim 16, further comprising:
a host processor communicatively coupled to the clock source and configured to receive an instruction to change the rate of the display clock; and
a display communicatively coupled to the host processor and configured to display data from the display data processing pipeline.

20. A non-transitory computer readable medium storing instructions, wherein the instructions when executed are adapted to perform a method comprising:
changing a rate of a display clock;
adapting a display data processing pipeline clocked by the display clock to prevent a substantial change in a pixel output rate from the display data processing pipeline based upon the changing, wherein a delay in the display data processing pipeline remains constant by adjusting a number of compensation pipeline stages; and,
writing an output data from the display data processing pipeline into a buffer at the pixel output rate.

21. The non-transitory computer readable medium of claim 20, wherein the adapting the display data processing pipeline comprises altering a depth of the display data processing pipeline.

* * * * *